US012632846B2

(12) United States Patent
Pinkus

(10) Patent No.: US 12,632,846 B2
(45) Date of Patent: May 19, 2026

(54) POINT OF SALE INTERMEDIATION SYSTEM

(71) Applicant: LAZLO 326, LLC, Jacksonville, FL (US)

(72) Inventor: Michael C Pinkus, Duluth, GA (US)

(73) Assignee: Lazlo 326, LLC, Alpharetta, GA (US)

( * ) Notice: Subject to any disclaimer, the term of this patent is extended or adjusted under 35 U.S.C. 154(b) by 733 days.

(21) Appl. No.: 17/017,972

(22) Filed: Sep. 11, 2020

(65) Prior Publication Data

US 2021/0073776 A1 Mar. 11, 2021

Related U.S. Application Data

(60) Provisional application No. 62/899,137, filed on Sep. 11, 2019.

(51) Int. Cl.
| | |
|---|---|
| G06K 19/06 | (2006.01) |
| G06K 7/14 | (2006.01) |
| G06Q 20/20 | (2012.01) |

(52) U.S. Cl.
CPC ......... G06Q 20/209 (2013.01); G06K 7/1417 (2013.01); G06K 19/06028 (2013.01); G06K 19/06037 (2013.01); G06Q 20/208 (2013.01)

(58) Field of Classification Search
CPC .... G06Q 20/209; G06Q 20/208; G06K 19/06; G06K 19/06028; G06K 7/01; G06K 7/1417; G06K 19/06037
See application file for complete search history.

(56) References Cited

U.S. PATENT DOCUMENTS

| | | | | |
|---|---|---|---|---|
| 2014/0372198 A1* | 12/2014 | Goldfinger | ............... | G07G 1/14 |
| | | | | 705/14.33 |
| 2018/0181951 A1* | 6/2018 | Goldfinger | ............... | G07G 1/14 |
| 2021/0374704 A1* | 12/2021 | Cummins | ............ | G06Q 20/203 |

* cited by examiner

*Primary Examiner* — Florian M Zeender
*Assistant Examiner* — Milena Racic
(74) *Attorney, Agent, or Firm* — Baker Donelson Bearman Caldwell & Berkowitz, PC

(57) ABSTRACT

A point of sale intermediation system is adapted to be integrated with a point of sales terminal, scanning device, receipt printer and/or additional peripheral devices. The system includes a first intermediary device that receives the electronic barcode scanned text data output from the scanning device and relays it to a data manager that utilizes the data represented in the electronic barcode scanned text data output and relays an electronic modified barcode scanned text data output back to the first intermediary device, which then relays the electronic modified barcode scanned text data output to the terminal. A second intermediary device that device receives an electronic printer data output from the terminal and relays it to the third party data manager. The third-party data manager utilizes the data represented in the electronic printer data output and relays an electronic modified printer data output back to the second intermediary device, which then relays it to the printer.

6 Claims, 2 Drawing Sheets

POINT OF SALE INTERMEDIATION SYSTEM

REFERENCE TO RELATED APPLICATION

Applicant claims the benefit of U.S. patent application Ser. No. 62/899,137 filed Sep. 11, 2019 and entitled Point Of Sale Intermediation System.

TECHNICAL FIELD

This invention relates generally to a system and method of machine reading text or images and outputting related text and various multimedia through the intermediation of point of sale systems and the peripherals attached electrically or radiant electromagnetically.

BACKGROUND OF THE INVENTION

Retail Point of Sale Systems ("RPOS SYSTEM") are fundamentally a means to identify a product or uniquely identified instrument such as a driver license or coupon using a symbol decoding device like a camera or laser scanner or human touch-based entry, determine the sales information related to that product or uniquely identified instrument, such as the item name, price, etc., total the products for final purchase or payment through a single transaction, and print a receipt for the final "basket" of purchased products or items or processing-outcome-based meta data such as human or machine-readable data. The system may also track and adjust inventory and/or perform other management operations.

Retail point of sale systems sold to a retailer by a vender rely on proprietary hardware and software which make it difficult for third party integration to occur either due to hardware incompatibility, and/or software incompatibility, and/or vendor unwillingness to modify the hardware and/or software to support innovative use cases or use cases which are not fiscally justifiable for the vender. Furthermore, because this integration is difficult, employee and/or consumer facing multimedia content displayed by retailers is often not associated to or contextually relevant to the products or uniquely identified instruments being purchased/presented in real time.

Thus, it would be beneficial to provide a means of third-party integration of innovative use cases while not requiring vender and/or vender peripheral hardware and/or software to be changed. It would also be beneficial to provide a real time, contextual, transactional display of identity, promotional, loyalty and competitive content in response to product or uniquely identified instrument information received by the RPOS SYSTEM peripheral devices.

Existing intermediate devices rely on wire splitting or similar Existing intermediate devices rely on wire splitting or similar data duplication methodologies which do not allow an optional translation and/or suppression and/or conditional insertion of the intercepted data packet to the point of sale terminal. In this prior art, the data is not intercepted, only a copy of the data is captured, the original is transmitted directly to the terminal. This precludes the concept of translation and/or suppression and/or conditional insertion and only allows for insertion of additional data packets after insertion of the originally scanned data packet.

It thus is seen that a need has existed for a system and method for adapting an existing point of sale system which enables a third party to integrate with the system through translation and/or suppression and/or conditional insertion, not duplication. Accordingly, it is to the provision of such that this invention is primarily directed.

SUMMARY OF THE INVENTION

In a preferred form of the invention a point of sale intermediation system comprises a scanning device that scans a machine-readable text and produces an electronic scanned text data output representing the machine-readable text. The system also has a sales system terminal and a data manager having software that converts electronic scanned text data output to a zero (none) or multiple modified electronic scanned text data output. The system also has a first electronic intermediary device coupled between said scanning device and said sales system terminal. The first electronic intermediary device receiving the electronic scanned text data output from the scanning device and transmitting the sero or multiple electronic scanned text data output to said data manager. The first electronic intermediary device also receiving the zero or multiple modified electronic scanned text data output from the data manager and transmitting the modified electronic scanned text data output to the terminal.

DETAILED DESCRIPTION

Figure 1:
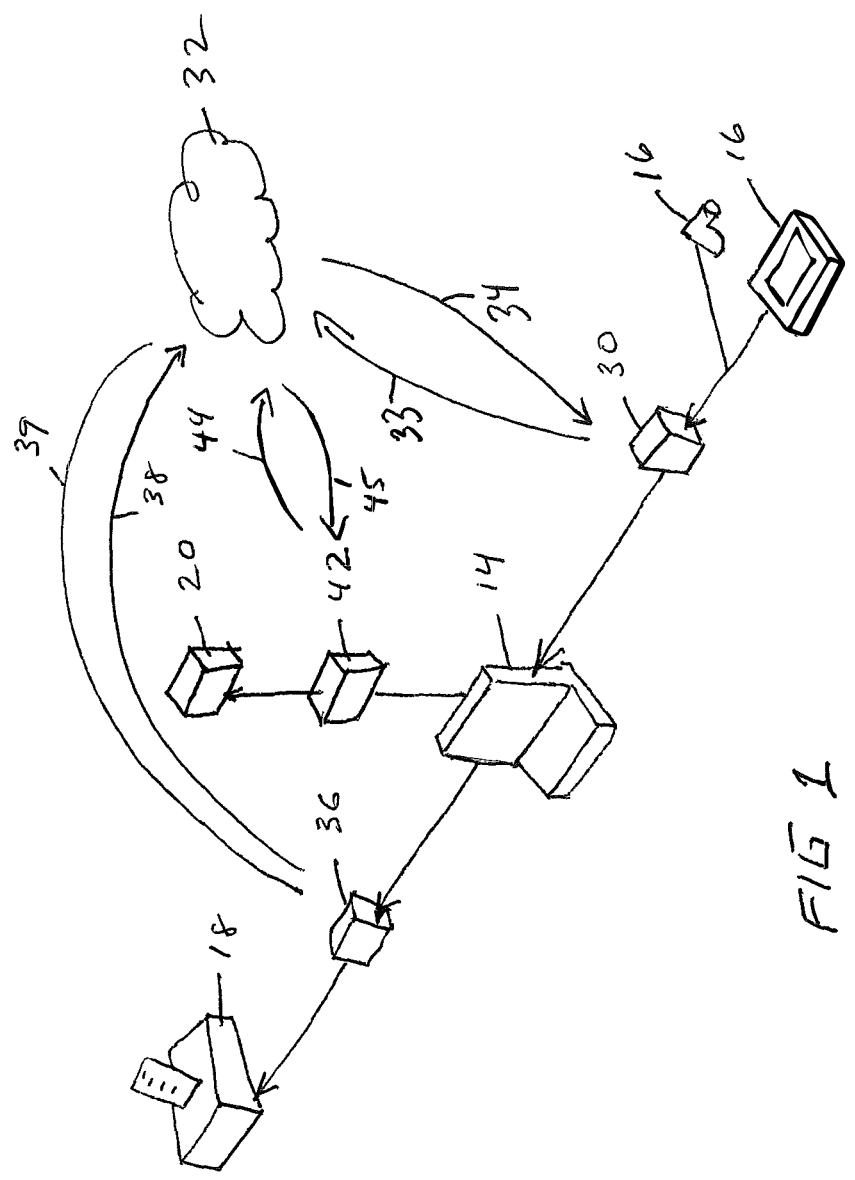
FIG. 1 is a point of sale intermediary system embodying principles of the invention in a preferred form.

With reference next to the drawings, there is shown a point of sale intermediation system 10 in a preferred from of the invention. The intermediation system 10 is adapted to be integrated with a conventional point of sale system 12 having a sales terminal 14, a scanning device 16, a receipt printer 18, and one or more ancillary peripheral 20 (such as scale, bump device, etc.). The scanning device 16 may be a wired or wireless handheld bar code device, an under-counter level bar code scanner, an above counter scanner, or other similar device, all of which are designed to scan an electronic machine-readable text such as a UPC-A barcode, QR code, PDF417 or similar encoded or non-encoded code or text, and in turn produce an electronic scanned text data output representing the machine-readable text, for case of explanation the barcode example will be used as a continuing example of the electronic machine-readable text and may be referenced as electronic barcode scanned text data output.

Figure 2:
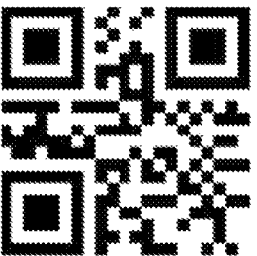
FIG. 2 is a two dimensional machine readable code.

The point of sale intermediation system 10 includes a first electronic intermediary or intercept device 30 electronically or electromagnetically positioned between the scanning device 16 and the sales terminal 14. The first electronic intermediary device 30 receives the electronic bar code scanned text data output (electronic signal or electronic scanned text data output) from the scanning device 16 and relays the electronic barcode scanned text data output to a third-party data manager 32. (as indicated by arrow 33), which may be done through a hardwired or wireless connection. The third party data manager 32 utilizes that data represented in the electronic barcode scanned text data output and relays the electronic modified barcode scanned text data output (modified electronic scanned text data output) back to the first electronic intermediary device 30 (as indicated by arrow 34), which then relays the electronic modified barcode scanned text data output to the terminal 14. It should be noted the novel method of interception can produce zero or more electronic modified barcode scanned text data output thus precluding the electronic barcode scanned text data output (electronic signal) from the scanning device 16 from relaying the electronic modified barcode scanned text data output to the terminal 14. This allows the first electronic intermediary device 30 or the third-party data manager 32 to interpret data or electronic data that is not understood by the terminal 14 and to then choose to return zero or more electronic modified barcode scanned text data output data to the terminal 14 which can be understood by the terminal 14. With a continuing example of a barcode, the terminal 14 may not be capable of understanding a 2D (two-dimensional) machine-readable code (machine-readable text) such as a QR code or PDF147 code, shown in FIG. 2, however, the first electronic intermediary device 30 or the third-party data manager 32 may be capable of understanding a 2D machine-readable code such as a QR code or PDF147 code and translating to an electronic modified barcode scanned text data output which is an electronic machine-readable text understood by the terminal 14.

The sale intermediation system 10 includes a second electronic intermediary or intercept device 36 electronically positioned between the terminal 14 and the receipt printer 18. The second electronic intermediary device 36 receives an electronic printer data output (electronic or electromagnetic signal) from the terminal 14 and relays the electronic printer data output to the third-party data manager 32 (as indicated by arrow 38), which may be done through a hardwired or wireless connection. The third-party data manager 32 utilizes the data, represented in the electronic printer data output and relays the electronic modified printer data output back to the second electronic intermediary device 36 (as indicated by arrow 39), which then relays the electronic modified printer data output to the receipt printer 18. It should be noted the novel method of interception can produce zero or more electronic modified printer data output, thus precluding the electronic modified printer data output (electronic or electromagnetic signal) from the receipt printer 18 from relaying the electronic modified printer data output to the receipt printer 18.

The sale intermediation system 10 includes a third electronic intermediary or intercept device 42 electronically positioned between the terminal 14 and the ancillary peripheral 20. The third electronic intermediary device 42 receives an electronic peripheral text data output (electronic or electromagnetic signal) from the terminal 14 and relays the electronic peripheral text data output to the third-party data manager 32 (as indicated by arrow 44), which may be done through a hardwired or wireless connection. The third-party data manager 32 utilizes the data represented in the electronic peripheral text data output and relays the electronic modified peripheral text data output back to the third electronic intermediary device 42 (as indicated by arrow 45), which then relays the electronic modified peripheral text data output to the terminal 14. It should be noted the novel method of interception can produce zero (none) or more electronic modified peripheral text data output, thus precluding the electronic modified peripheral text data output (electronic or electromagnetic signal) from the receipt printer 18 from relaying the electronic modified printer data output to the terminal 14. In use, the barcode (data or machine-readable text) of a desired product selected by a consumer is scanned by scanning device 16. The scanned barcode is converted to an electronic barcode scanned text data output which is intended to be sent to the terminal for processing, but instead is intercepted by the first electronic intermediary device 30. The first electronic intermediary device 30 sends the barcode scanned text data output to the data manager 32, as indicated by arrow 34.

Figure 3:
FIG. 3 is a one dimensional machine readable code.

The data manager 32 may then utilize or manipulate the data in the form of the barcode scanned text data output for other purposes. For example, the barcode scanned text data output may arrive as a. complex two-dimensional barcode (QR graphic scan), which is a machine-readable text or data that is not understood by the terminal, wherein the data manager may then convert the two-dimensional barcode text data output to a simple 1D (one dimensional) graphic scan (barcode scan) as the modified barcode scanned text data output, which is a machine-readable text or data that is understood by the terminal, shown in FIG. 3. The conversion from one data format to another data format may be accomplished through a database that compares and contains the proper conversion from one format or data output to another format or data output.

As another example, the data manager 32 may utilize the product code (data or machine-readable text) represented by the barcode scanned text data output to add value to the product code or barcode text data output. Specifically, should the barcode or barcode scanned text data output be associated with a particular soft drink, the data manager 32 may provide a coupon or other value for a snack (potato chips) in electronic form and add that to the barcode scanned text data output, such that when the now modified barcode scanned text data output is optionally sent back to the first electronic intermediary device 30 it now optionally includes the electronic information for the soft drink and optionally the electronic information for the snack (potato chips). Thus, the modified barcode text data output has been manipulated to include additional value, which may be in any form, such as a coupon, discount, additional goods, buyer reward points, etc. The modified barcode scanned text data output is then optionally sent to the terminal 14, as indicated by arrow 34. The terminal 14 is "unaware" that the modified barcode scanned text data output has been manipulated since leaving the barcode scanner 16, as the terminal simply receives the modified barcode scanned text data output as if it were conventionally sent by the barcode scanner 16. As the terminal 14 and related components are unaware of the manipulation by the third-party data manager 32, the system is considered to use a passive interception method for adding value.

Once the terminal 14 receives the modified barcode scanned text data output, it utilizes the modified barcode scanned text data output in conventional fashion, such as adding the product code, price, etc. to the list of items in the "basket" or total. Once all products have been scanned in this fashion, the terminal 14 sums the total and produces a printer data output which is intended to be sent to the receipt printer 18, but which is intercepted by the second electronic intermediary device 36. The second electronic intermediary device 36 then sends the printer data output to the data manager 32, as indicated by arrow 38.

The data manager 32 may then utilize or manipulate the printer data output for other purposes. For example, the barcode scanner 16 is a continuous scanning device which does not acknowledge, indicate, or provide for the end of a person's transaction or "basket" of products. Therefore, by the data manager 32 receiving the printer data output, the data manager 32 knows that all products for that customer have been scanned and tabulated and that the transaction is complete. This acknowledgement may be referenced as knowing the "state" of the transaction. The data manager 32 may produce a modified receipt text data output, as shown by arrow 39, which includes any coupon or other added value printable text to the standard printable text. For example, the modified receipt text data output may be a one-dimensionally encoded graphic (barcode) which was produced from the two-dimensionally encoded graphic originally scanned by scanning device 16. As another example, the modified receipt text data output may include coupons, raffle tickets, lottery entries, discounts, or other similar text. As another example, the modified receipt text data output may include a completely changed output such as a different language of text in the receipt. The second electronic intermediary device 36 therefore produces a graphic display to be printed by the receipt printer 18. The modified receipt text data output is sent to the receipt printer 18 so that a receipt is printed in conventional manner.

Similarly, the third electronic intermediary device 42 may intercept any peripheral text data output from the terminal 14 to a peripheral device 20 and send it to the data manager 32 for any change or manipulation. For example, should a television screen be used as a peripheral device 20, the scanning of a certain soft drink which is realized by the data manager 32, results in an advertisement being shown on the television for that product or a related product to entice the customer such as chips.

It should be understood that the conventional wiring between the terminal 14, scanning device 16, receipt printer 18, and peripheral 20, along with the additional wiring by the addition of the first, second and third electronic intermediary devices, may be any conventionally used hardwired connectors, such as CAT-5, USB type or DB9 and using any conventionally used wired protocol such as RS232, R5422 or RS485 or may be any conventionally used wireless connection protocol such as BLE, Bluetooth, Wi-Fi or other electromagnetically radiant signal.

It should be understood that the present invention may also be used to scan other vendor's complex encoded values and the like and convert them to a decoded value which is familiar to the conventional system. For example, a 2D or complex delivery service barcode (Federal Express) may be scanned by the scanning device 16, sent to the first electronic intermediary device 30 which then relays it to the data manager 32. The data manager 32 then converts the complex 213 decoded value to a 1D decoded value recognized by the terminal 14. The data manager may also obtain or send information to a third party, such as Federal Express, wherein the data manager may inform the third party of certain aspects, such as the purchase of the package delivery service, or obtain information from the third party, such as pricing information for the package. As such, the third party may provide the data manager with information (a $200 charge for package delivery) which is included in the data sent to the terminal 14. The data manager 32 then sends a simple 1D decoded value to the terminal 14 wherein the delivery may be added to the shopping "cart" for payment by the customer through the remaining steps of the process. By interception of the printed receipt the data manager can then send confirmation of payment to the third party. As such, any conventional system may become a more complex system which is capable of processing more complex operations without modification to the existing hardware or software. Thus, a convenience store, using its existing less complex sales terminal, may become a delivery service sending and receiving office and record required sales data in its sales terminal software.

It should be understood that the terminal 14 may include or incorporate the printer 18 within the terminal 14, rather than having the terminal and primer separate components. It should be understood that the terminal 14 may include or incorporate the scanner within the terminal 14, rather than having the terminal and seamier separate components. It should be understood that the scanning device 16 may include or incorporate the first electronic intermediary device 30, rather than having separate components. It should be understood that the printer may include or incorporate the electronic intermediary device, rather than having separate components.

It should be understood that if a problem occurs relating to the barcode, such as the barcode is not recognized by the data manager, the data manger will not transmit the data to the first electronic intermediary device 30. Also, if an additional verification is required, such as an age verification due to the purchase of tobacco or alcohol, the point of sale system will suppress the data transfer until a proper verification is provided.

Thus, because point of sale systems rely on peripheral devices with standardized formats and encoding of inputs and outputs (text data outputs), it is proposed to intercept the inputs and outputs using intermediary devices that capture input, communicate the input and output to a data manager (could be cloud based system), perform processing of the inputs and outputs, then directing the appropriate processed inputs or outputs to the input or output device it was originally intended to be received from or to which is was intended to be sent. In this manner, added value or a conversion may be integrated into a conventional system without having to change or update the conventional hardware or software as all received text data outputs are received in what appears to be conventional form and without the receiving device knowing that additions have been made to the text data output.

The invention claimed is:

1. A point of sale intermediation system comprising:

an electronic machine-readable text scanning device that scans a visual machine- readable text and produces an electronic scanned text data output representing the visual machine-readable text;

a first electronic intermediary device electronically coupled to said scanning device to receive said electronic scanned text data output from said scanning device;

a data manager in electronic communication with said first electronic intermediary device, said data manager converts said electronic scanned text data output to a modified electronic scanned text data output, and a sale system terminal electronically coupled to said first electronic intermediary device to receive said modified electronic scanned text data output from said first electronic intermediary device.

2. The point of sale intermediation system of claim 1, wherein said data manager converts an electronic printer data output to a modified electronic printer data output, and wherein said point of sale intermediation system further comprises:

a printer, and a second electronic intermediary device electronically coupled to said terminal and said printer, said second electronic intermediary device receiving an electronic printer data output from said terminal and transmitting said electronic printer data output to said data manager, said second electronic intermediary device also receiving a modified electronic printer data output from said data manager and transmitting said modified electronic printer data output to said printer.

3. The point of sale intermediation system of claim 2;
wherein said data manager converts an electronic periph-
eral text data output to a modified electronic peripheral
text data output,
and said point of sale intermediation system further comprises:
an ancillary peripheral device, and
a third electronic intermediary device electronically
coupled to said terminal and said ancillary peripheral
device, said third electronic intermediary device receiving an electronic peripheral text data output from said
terminal and transmitting said electronic peripheral text
data output to said data manager, said third electronic
intermediary device also receiving a modified elec-
tronic peripheral text data output from said data manager and transmitting said modified electronic periph-
eral text data output to said ancillary peripheral device.

4. The point of sale intermediation system of claim 1
wherein said electronic scanned text data output represents
any data understandable by the scanning device.

5. The point of sale intermediation system of claim 4
wherein said modified electronic scanned text data output
represents any data understandable by the sales terminal.

6. The point of sale intermediation system of claim 1
wherein said first electronic intermediary device communicates with said data manager through a wireless communi-
cation network.

\*   \*   \*   \*   \*